US009516508B2

(12) United States Patent
Amanna et al.

(10) Patent No.: US 9,516,508 B2
(45) Date of Patent: Dec. 6, 2016

(54) SYSTEM AND METHOD FOR HETEROGENOUS SPECTRUM SHARING BETWEEN COMMERCIAL CELLULAR OPERATORS AND LEGACY INCUMBENT USERS IN WIRELESS NETWORKS

(71) Applicants: Ashwin Amanna, Leesburg, VA (US); Joseph Mitola, III, St. Augustine, FL (US); Thomas Charles Clancy, Washington, DC (US); Jeffrey H. Reed, Blacksburg, VA (US); Robert McGweir, Blacksburg, VA (US); Avik Sengupta, Blacksburg, VA (US); Akshay Kumar, Blacksburg, VA (US)

(72) Inventors: Ashwin Amanna, Leesburg, VA (US); Joseph Mitola, III, St. Augustine, FL (US); Thomas Charles Clancy, Washington, DC (US); Jeffrey H. Reed, Blacksburg, VA (US); Robert McGweir, Blacksburg, VA (US); Avik Sengupta, Blacksburg, VA (US); Akshay Kumar, Blacksburg, VA (US)

(73) Assignees: Federated Wireless, Inc., Arlington, VA (US); Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 13/835,012

(22) Filed: Mar. 15, 2013

(65) Prior Publication Data
US 2014/0274104 A1    Sep. 18, 2014

(51) Int. Cl.
*H04W 72/00* (2009.01)
*H04W 16/14* (2009.01)
(Continued)

(52) U.S. Cl.
CPC ............. *H04W 16/14* (2013.01); *H04W 28/16* (2013.01); *H04W 72/02* (2013.01); *H04W 72/04* (2013.01); *H04W 72/12* (2013.01); *H04W 88/08* (2013.01)

(58) Field of Classification Search
CPC ...... H04W 16/14; H04W 72/00; H04W 72/02; H04W 72/04; H04W 72/12; H04W 28/16; H04W 88/08
(Continued)

(56) References Cited

U.S. PATENT DOCUMENTS

2005/0094675 A1* 5/2005 Bhushan et al. .............. 370/527
2008/0102845 A1* 5/2008 Zhao ............................ 455/450
(Continued)

FOREIGN PATENT DOCUMENTS

EP          2693792 A1    2/2014
WO    WO 2013/127355 A1    9/2013
(Continued)

OTHER PUBLICATIONS

Youping Zhao, "Enabling Cognitive Radios through Radio Enviroment Maps", May, 2007 retrieved from the Internet: URL:http://hdl.handle.net/10919/27826.
(Continued)

*Primary Examiner* — Thai Vu
(74) *Attorney, Agent, or Firm* — Finnegan, Henderson, Farabow, Garrett & Dunner, LLP (57) ABSTRACT

Described herein are systems and methods for telecommunications spectrum sharing between multiple heterogeneous users, which leverage a hybrid approach that includes both distributed spectrum sharing, spectrum-sensing, and use of geo-reference databases.

23 Claims, 9 Drawing Sheets

(51) Int. Cl.
*H04W 28/16* (2009.01)
*H04W 72/02* (2009.01)
*H04W 72/12* (2009.01)
*H04W 72/04* (2009.01)
*H04W 88/08* (2009.01)

(58) Field of Classification Search
USPC ............... 455/446, 447, 448, 450, 451, 452.1,455/452.2, 453, 454, 464
See application file for complete search history.

(56) References Cited

U.S. PATENT DOCUMENTS

| | | | |
|---|---|---|---|
| 2009/0219876 A1* | 9/2009 | Kimura et al. | 370/329 |
| 2009/0245213 A1* | 10/2009 | Zaki et al. | 370/336 |
| 2011/0070911 A1* | 3/2011 | Zhang et al. | 455/509 |
| 2011/0176497 A1* | 7/2011 | Gopalakrishnan | 370/329 |
| 2012/0094681 A1* | 4/2012 | Freda et al. | 455/452.1 |
| 2012/0300629 A1* | 11/2012 | Drucker | 370/235 |

FOREIGN PATENT DOCUMENTS

| WO | WO 2014/036150 | 3/2014 |
|---|---|---|
| WO | WO 2014/144079 A2 | 9/2014 |

OTHER PUBLICATIONS

International Search Report mailed Jun. 1, 2015 in International Application No. PCT/US2015/011113 (3 pages).

\* cited by examiner

SYSTEM AND METHOD FOR HETEROGENOUS SPECTRUM SHARING BETWEEN COMMERCIAL CELLULAR OPERATORS AND LEGACY INCUMBENT USERS IN WIRELESS NETWORKS

FIELD

This disclosure relates to a system and method for wireless communication spectrum sharing.

BACKGROUND

The proliferation of smartphones and other mobile devices has placed heavy data traffic demands on cellular networks, with cellular network operators facing difficult challenges in meeting this demand given their existing spectrum allocations. Recent policy shifts at the federal levels and Department of Defense indicate that sharing existing federal spectrum with commercial users may be a viable option for meaningful increase of spectrum for Long Term Evolution (LTE) fourth generation (4G) cellular technologies. Making more spectrum available will certainly provide opportunities for mobile broadband capacity gains, but only if those resources can be efficiently accessed such that secondary users can proactively share the same bands as the primary users (e.g., federal incumbent users). Effectively grafting pre-emptible spectrum into a cellular network is challenging. Past approaches to coexistence with primary users centered on spectrum sensing-based dynamic spectrum access (DSA) techniques and database driven DSA techniques.

Spectrum sensing DSA approaches entail the use of sensing devices to scan a frequency band of interest to identify unused spectrum where secondary access is possible without impacting primary user operations. The main approaches can be categorized as internal (co-located) sensing, external sensing, use of beacons, and database driven techniques, and have included algorithms for matched filtering, energy detection, cyclostationarity, radio identification based sensing, waveform based sensing, etc. So-called cooperative spectrum sensing increases sensing accuracy by fusing data from multiple nodes and thus takes advantage of spatial diversity. General types of cooperative spectrum sensing include centralized, distributed, external, or device centric (local) sensing.

Database driven DSA is a sub-class of the sensing based DSA approach. The database driven approach is classified into two general categories: geo-location based and interference based. Both are similar in principle that they provide a database to the secondary users (cellular network operators) which helps them transmit in licensed bands while ensuring they do not interfere with primary users in the given band. These databases can be stored at eNodeBs or at the network level and have different levels of granularity. In the past, these databases only provided coarse resolution of historical spectrum use by primary users. A type of database called a radio environment map (REM), which can contain interference information, have been utilized to help in deploying secondary networks. However, each of these approaches has shortcomings, especially when mobile users, hidden nodes, and interaction with the incumbent or primary users are considered.

Therefore a need exists for an improved system and method for temporal and geographical spectrum sharing between a commercial cellular operator and a government incumbent operator.

SUMMARY OF THE INVENTION

Described herein are systems and methods for spectrum sharing between multiple heterogeneous users, which leverage a hybrid approach that includes both distributed spectrum sensing and use of geo-reference databases. A hybrid approach can be thought of as a combination of dynamic spectrum sensing with use of a radio environment map (REM) with local sensing information. This approach allows opportunistic access to government spectrum bands in a controlled manner, utilizing both DSA sensing and database interaction, to maximize fallow spectrum while simultaneously minimizing the potential for interference to incumbent users.

As a general overview, commercial cellular operators seeking additional temporary frequency allocations perform an analysis incorporating spectrum sensing to identify potential primary users. This sensing can occur at the base station, at the end user, or at a new network component in communication with at least one base station. Cellular operators send a request query to a federal database server connected to databases having information on temporal and geographical spectrum assignments and any potential interference. Incumbent federal spectrum users typically include government entities. After an interference analysis, the federal database server assigns temporary spectrum allocations that are unique in time and geographic location. Allocation of the assigned spectrum bands is performed using a two-tier approach to allocate resources to users. A first tier allocation process allocates resources to cell zones, and a second tier process allocates resources to users in their respective cell zones.

Efficient space-time spectrum utilization can thus be achieved between a primary user (denoted by PU, i.e., the government incumbent operator) and a secondary user (denoted by SU, i.e., the cellular operator) while maintaining the interference experienced by the primary user below a particular threshold. Further, a low-latency protocol for interaction between a spectrum server and a federal database server ensures that the spectrum server is notified in almost real time, if required to preempt a prior spectrum allocation. Parameters for a spectrum lease request are determined with an objective of maximizing the network utility derived from the requested spectrum. The spectrum server honors a set of transmission restrictions associated with the allocated primary spectrum by incorporating the restrictions into the spectrum allocation algorithms at the spectrum server and at an eNodeB level. The two-tier approach for resource allocation among users is utilized which results in a slightly suboptimal but more tractable solution compared to a joint resource allocation scheme. A first tier allocation process allocates resources to cell zones, and a second tier process allocates resources to users in their respective cell zones.

The resource allocation process at the spectrum server attempts to maintain an acceptable QoS (quality of service) for users while still satisfying the capacity demand of the users within the cells of the cellular network. To this end, a fractional frequency reuse (FFR) scheme is proposed in which each cell is divided into zones: a center cell zone and three cell-edge sector zones. This process takes as feedback a novel metric called the average demand factor from each eNodeB under the spectrum server's control. This metric models the rate requirement of capacity deficient users at cell-edge zones and thus ensures fairness in allocation of resources to each of the four zones. The calculation of the fractional utility metric is unique in a way that makes it easy to incorporate federal restrictions and local sensing decision variables.

The eNodeB level resource allocation method allocates resources to individual users within each zone. The eNodeB calculates instantaneous demand factors of each user within the cell and stores these values. The demand factors are averaged over time and users and fed back to the spectrum server whenever needed for operation of the resource allocation process. This leads to appreciable reduction in communication overhead. The fairness among the users is introduced using a weighted linear utility function. User allocation is achieved by solving a linear integer programming problem instead of a typical non-linear integer programming problem, thereby significantly reducing complexity while settling for a slightly suboptimal (in terms of fairness) solution. The time-interval between two executions of the eNodeB level allocation process is flexible and thus allows the process to run at different time scales, as desired.

DETAILED DESCRIPTION

As an overview, the systems and methods described herein present an approach for enabling spectrum sharing between a government user and a commercial cellular operator. The main components of the system include the commercial radio access network, the commercial packet core, a spectrum server having interaction with a federal database server controlled by a government entity, and sensors that provide real-time spectrum sensing and interference monitoring. In general, a commercial network is able to make requests for additional spectrum resources to support the demands of end users. A spectrum server will make requests to a federal database server that has knowledge of the incumbent users provided from a master government file and knowledge of interference with respect to the incumbent users. In conjunction with the database knowledge, information regarding real-time spectrum sensing performed locally at commercial base stations is used to award spectrum resource allocation to the commercial base stations. This system and method assume that the commercial end users, such as handsets, and base stations are capable of operating on the available government spectrum. The awarded government spectrum resource is provided to the commercial cellular operator for use by the base stations to supplement their existing spectrum. These awards may include temporal, geographical, and operational constraints such as maximum power transmission. It is envisioned that this additional spectrum can provide additional resources for low priority data. In the event that the incumbent government user requires the awarded spectrum, the commercial cellular operator will be required to vacate the awarded allocation. The novel contributions of this system include the method for requesting resources, determining how much and which band to request, and the process for allocating awarded resources to base stations and end users.

Figure 1:
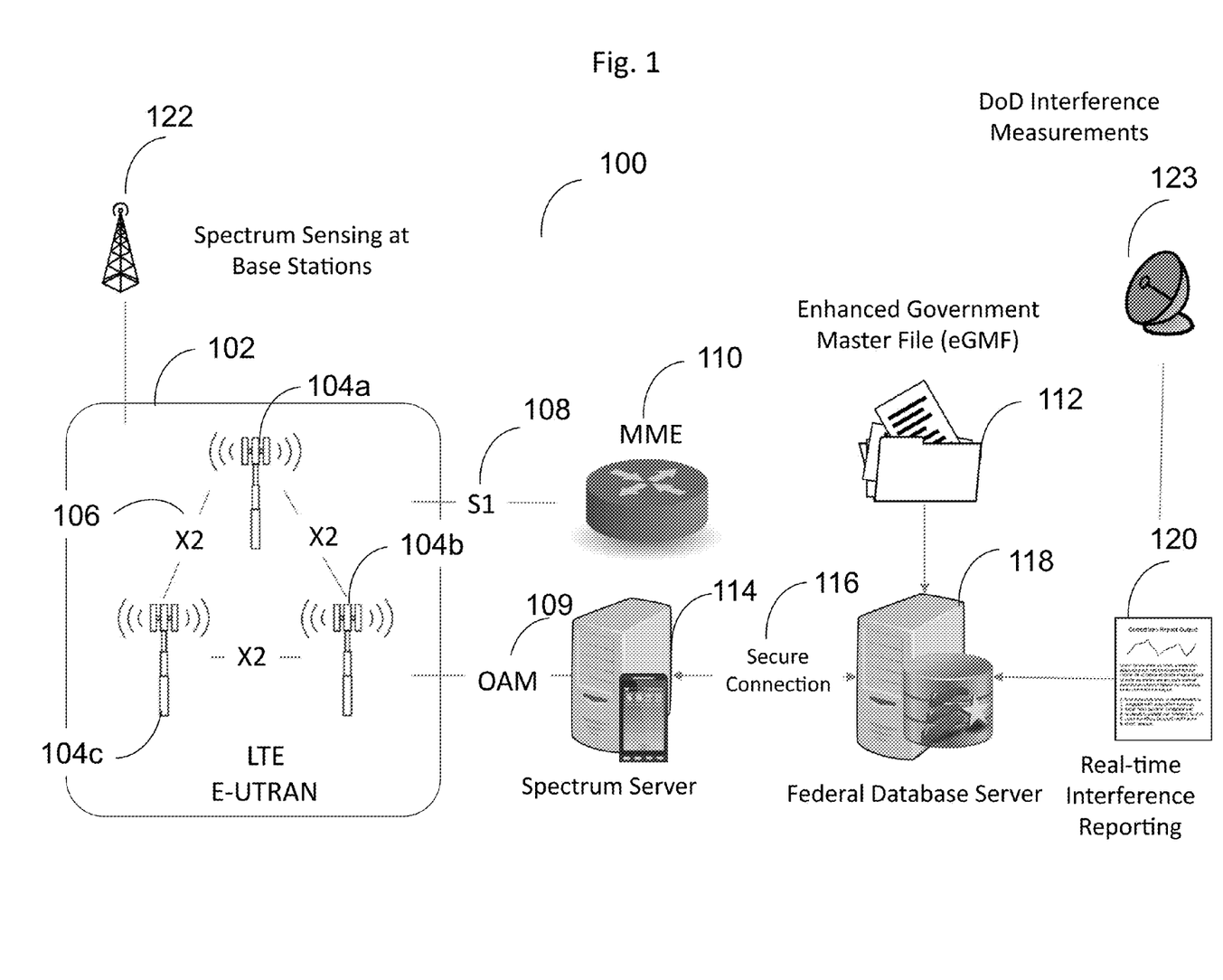
FIG. 1 is a block diagram of an exemplary system for spectrum sharing and illustrates the infrastructure of a commercial cellular operator using LTE technology, and includes a spectrum server in communication with a federal database server.

Referring to FIG. 1, an exemplary system 100 for spectrum allocation is shown in which a commercial cellular operator has deployed an LTE architecture. System 100 includes a radio access network (RAN) 102, represented here by LTE E-UTRAN, which is comprised of individual enodeB's 104a-c, interconnected through the X2 interface 106. The RAN 102 connects to an evolved packet core represented by a mobile management entity (MME) 110. The connection is enabled through the S1 interface 108. In this exemplary system, end user elements, such as handsets, which are either mobile or static, interact with the RAN 102. Data schedulers, residing in the enodeB's, are used to coordinate transmissions of voice or packet data to the end user elements, denoted as secondary users. Sensors 122 perform spectrum sensing at the base stations to determine the possible presence of federal incumbent users, whose presence may not be known with certainty in advance due to their mobility, and/or failure to update a federal database.

A proposed spectrum server 114 interfaces with the RAN through the Operations and Maintenance (OAM) interface 109. The spectrum server 114 connects via secure connection 116 with a federal portion of the system 100, which includes a federal database server 118, database 112, and database 120. From a functional perspective, the spectrum server 114 aggregates the needs of the base stations, makes requests to the federal database server 118, and manages any awarded spectrum back to the individual base station. Federal interference sensors 123 provide interference sensing on the federal side, such as to detect any interference with federal systems.

More specifically, federal database server 118 interacts with databases 112 and 120. Database 120 is a real-time interference reporting database. The federal database server 118 performs an interference analysis prior to a spectrum allocation, using information from this database. This database also provides information important for revocation of spectrum. For example, if a government radar system starts to sense that it is being interfered with, and it is due to a previous spectrum allocation to a commercial operator, an interference analysis will drive the federal database server to revoke or constrain that previous allocation. The federal database server does not provide information about its operations, rather it will only approve, or disapprove requests and may add constraints to any approved allocation.

Database 112 includes one or more enhanced Government Master Files, which includes information on temporal and geographical spectrum dynamics. Currently, a primitive Government Master File (GMF) exists which is basically a list of spectrum allocations and their locations. An enhanced version of such a file can also include information of when various users are operating, including such factors as duty cycle, power of the system, antenna beam pattern, and so on. The federal database server can also incorporate this information into allocation decisions. For example, if a spectrum band is typically devoted to the Army but the Army only uses it for special training exercises at certain times, the federal database server can allocate the band for specific other times. Similarly, if a satellite system only transmitted data once every hour for two minutes, then there is a significant period of idle time for that band that could be allocated to a commercial operator.

Regarding operation of this system, novel contributions include the hybrid interaction between spectrum sensing and database driven DSA approaches. Leveraging both techniques yields the ability to characterize the position, directionality, power, and modulation of relevant emitters in a localized region. An additional novel contribution includes the use of radio environment mapping by the spectrum server that integrates current sensing data from base station sensors 122 and historical spectrum sensing data from eGMF 112. Further, incorporating real-time interference knowledge enables the use of initial conservative interference assumptions when allocating government spectrum. These interference assumptions can gradually grow less strict until the spectrum sensing identifies interference. This approach enables online tenability of propagation models and truer interference thresholds, which are difficult to capture in analytical models. This approach is a novel contribution over existing state-of-the-art designs implementing static approaches. The implications include enabling access to significant amount of additional spectrum for commercial use.

Figure 2:
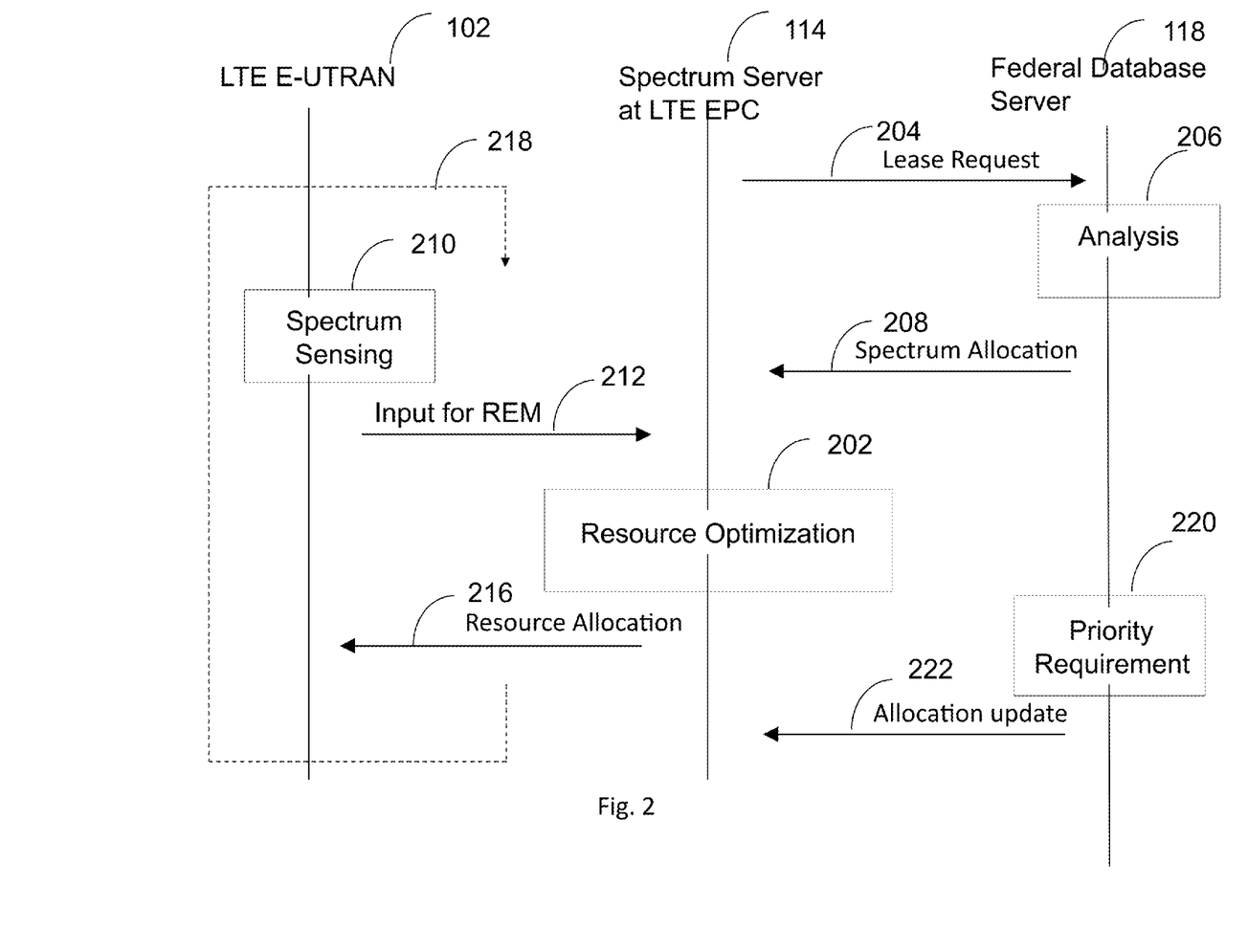
FIG. 2 is a flow diagram of interaction between the LTE wireless system, the spectrum server, and the federal database server of FIG. 1 as part of a process for spectrum sharing.

Referring to the system in FIG. 2, a spectrum sharing process of system 100 starts with the network, represented here by the spectrum server 114, which can be located in the enhanced packet core (EPC), issuing a lease request 204 for spectrum allocation to the federal database server 118 (an exemplary request process is further explained with respect to FIG. 4). The federal database server 118 makes a decision regarding what, if any, spectrum resources are available by performing an analysis 206, including an interference analysis. Any spectrum availability will be further specified with restrictions on time length, location, power, and most importantly, whether or not the commercial user will have unrestricted access or if the commercial user must also perform spectrum sensing and leave the band if it detects a primary user. The federal database server takes into account several different types of information in order to make any awards to the spectrum server 114. As mentioned, assessment of any interference to federal incumbent users is one element that affects the decision process for awarding resources to the spectrum server or for changing existing allocation. For example, if a previous request for spectrum was approved by the federal database server, and an updated interference analysis shows that a federal user is being impinged upon, the federal database server may revoke or further restrict an allocation. The overall decision process by the federal database server incorporates broad parameters in the decision such as the need for operational security, fairness in allocating resources to secondary users, and determining dynamic interference mitigation procedures. Upon completion of the analysis, the federal database server returns initial allocations 208 back to the spectrum server. This allocation may incorporate several constraints, including detection thresholds that define criteria for vacating a band in a specific sub-region.

The spectrum server 114 can incorporate spectrum-sensing input 210 from sensors 122 at the base stations in the RAN 102, both in the lease request and as part of a resource optimization process 202. The sensing from the RAN is conveyed at 212 to the spectrum server 114 for assimilation into a radio environment map (REM). A REM can be as simple as a table of location, time, and energy detected. It can be used to track historical and geo-located spectrum data. For example, every day at 5 PM at a major office park, cell phone usage peaks as people leave from work to head home. However, at 6 PM, there may be little cell phone usage. As another example, near a construction site there may be interference from high-powered welding during work hours, but little interference during non-work hours. This REM can provide more data for an artificial intelligence decision making algorithm to make more informed decisions. The REM can include items such as location, time, day, strength of signal, whether users are mobile and when, travel directions, and so on. This information can be combined with geographic data such as terrain, tree cover, season of the year (summer=high foliage, autumn/winter=no leaves), elevation, potential tall buildings, and many other possible relevant items that can affect radio signals.

In some embodiments, spectrum sensing is performed using a separate energy detector located at each base station. In other embodiments, spectrum-sensing data is obtained from individual handsets using the Minimize Drive Test (MDT) capability in release 10 of the LTE standards. The MDT capability enables functionality for enodeB's to poll end user devices for received signal strength data. The returned signal strength can be used by the spectrum server to populate REM profiles.

The REM and the spectrum allocation information 208 are used in a resource optimization process 202. The results of the optimization take the form of resource allocation 216 that is sent back to individual base stations in the RAN 102. The network continually performs the sensing/resource allocation process, which refines the distribution within the network. The federal database server 118 can provide allocation updates at block 222, including revoking the original spectrum allocation under a variety of circumstances. These can include expiration of the original allocation, reports of harmful interference or a priority request from other federal users that have pressing needs, analyzed at block 220. In all cases, the spectrum server 114 can make a new allocation request.

In more detail, still referring to FIG. 2, this process flow incorporates the spectrum server 114 as an intermediate interface between commercial users and disparate government incumbent users. The present method and system enables the interaction between heterogeneous networks encompassed by systems that do not share common packet cores and only use similar spectrum allocations in geographic proximity. Past approaches relied on geographic exclusion zones, limited operational cycles, or highly restrictive frequency allocations. In particular, the interaction between the PU (controlled by the federal database server) and the SU (eNodeB controlled by the spectrum server) to achieve efficient space-time spectrum utilization maintaining the interference experienced by the primary user below a particular threshold is unique to this area. Further novelty involves the use of a unique combination of several network parameters to prepare the spectrum lease. These parameters include available PU bands, average traffic volume, and quality of service (QoS) requirements of active users. These parameters are factored in while preparing the spectrum lease request. This scheme is quite flexible in the sense that it takes into account different possible spectrum lease formats (specified by the federal database sever) while preparing the spectrum lease request. The parameters for the spectrum lease request are determined with an objective of maximizing the network utility derived from the requested spectrum. The spectrum server honors the transmission restrictions associated with the allocated primary spectrum by incorporating this information into the spectrum allocation algorithms at the spectrum server and eNodeB level.

The present method and system provided herein provides a coordination mechanism between heterogeneous systems, which permits spectrum coexistence in real-time without highly restrictive frequency allocations. In particular, the interaction between a PU (Primary User—controlled by federal database server) and the SU (Secondary User—via eNodeB's controlled by spectrum server) to achieve efficient space-time spectrum utilization while maintaining the interference experienced by the primary user below a particular threshold is a new feature. Further novelty involves the use of a unique combination of several network parameters to prepare the spectrum lease. These parameters include available PU bands, average traffic volume, and quality of service (QoS) requirements of active users. These parameters are factored in while preparing the spectrum lease request. This scheme is quite flexible in the sense that it takes into account different possible spectrum lease formats (specified by the federal database server) while preparing the spectrum lease request. The parameters for the spectrum lease request are determined with an objective of maximizing the network utility derived from the requested spectrum. The spectrum server honors the transmission restrictions associated with the allocated primary spectrum by incorporating this information into the spectrum allocation algorithms at the spectrum server and eNodeB level.

Figure 3:
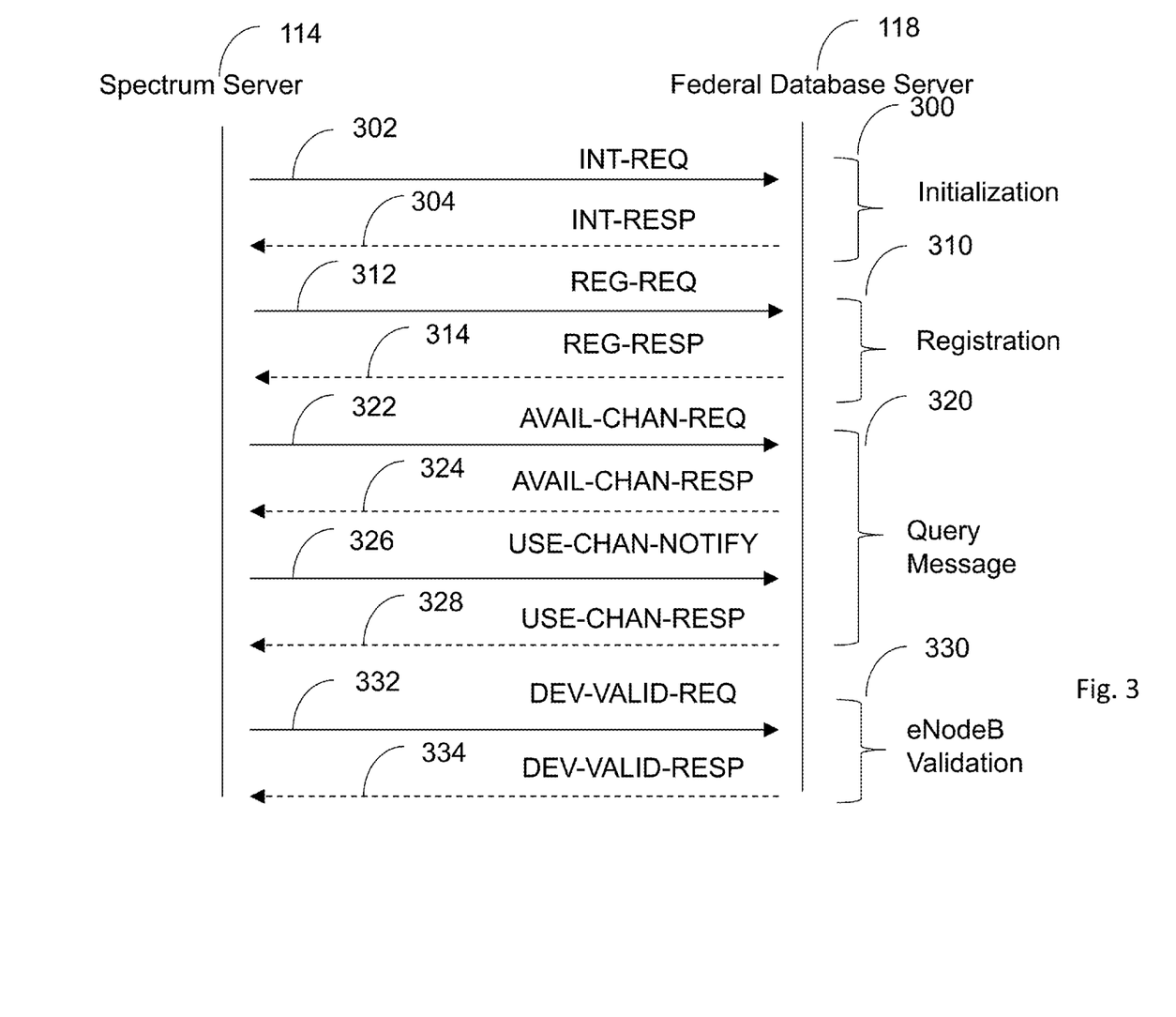
FIG. 3 is an illustration of an exemplary signaling exchange implemented for initialization, registration, allocation request, and validation between the spectrum server and the federal database server.

Referring to FIG. 3, an exemplary signaling exchange implemented for initialization, registration, allocation request, and validation between the spectrum server 114 and federal database server 118 is shown. Database discovery starts with location of a uniform resource identifier that uniquely identifies a specific database server. The initialization process 300 consists of a pair of messages including an initial service request 302 and initial response 304. This exchange enables the spectrum server to information such as capabilities, regulatory domain, and the desired sequence of protocol operations. The spectrum server 114 will also obtain authentication parameters from the federal database server 118 that will enable the spectrum server to prove its authenticity and provide message integrity during the entire protocol operation. After the initialization process, the spectrum server and federal database server exchange another pair of messages as part of the registration process 310. The registration exchange establishes operational parameters as required by the spectrum management authority, such as the Federal Communications Commission. Parameters can include owner and/or operator contact information, location and antenna height parameters. This registration process is required upon initial contact or when operational parameters change. The registration message pair consist of a registration request 312 and a registration response 314. The next step after the registration and mutual authentication is a query message process 320. The spectrum server sends an available channel query 322 that includes required parameters, such as geo-location. The federal database server returns an available channel response 324 that includes an array of available channels (spectrum bands) within the scope of the request and regulatory authority. Information in the array includes the frequency range, availability rating, operating power, and event management. The spectrum server 114 must then inform the federal database server 118 via a use channel notify communication 326 to indicate channels it intends on using at specific enodeB's in the network. The federal database server acknowledges with a use channel response 328. Finally, the enodeB's under control of the spectrum server require validation 332 by the federal database server. By FCC rules, a spectrum server can allocate secondary spectrum after enodeB's are registered in the database. Therefore the federal database server supports the validation by responding with an acknowledgement 334.

Figure 4:
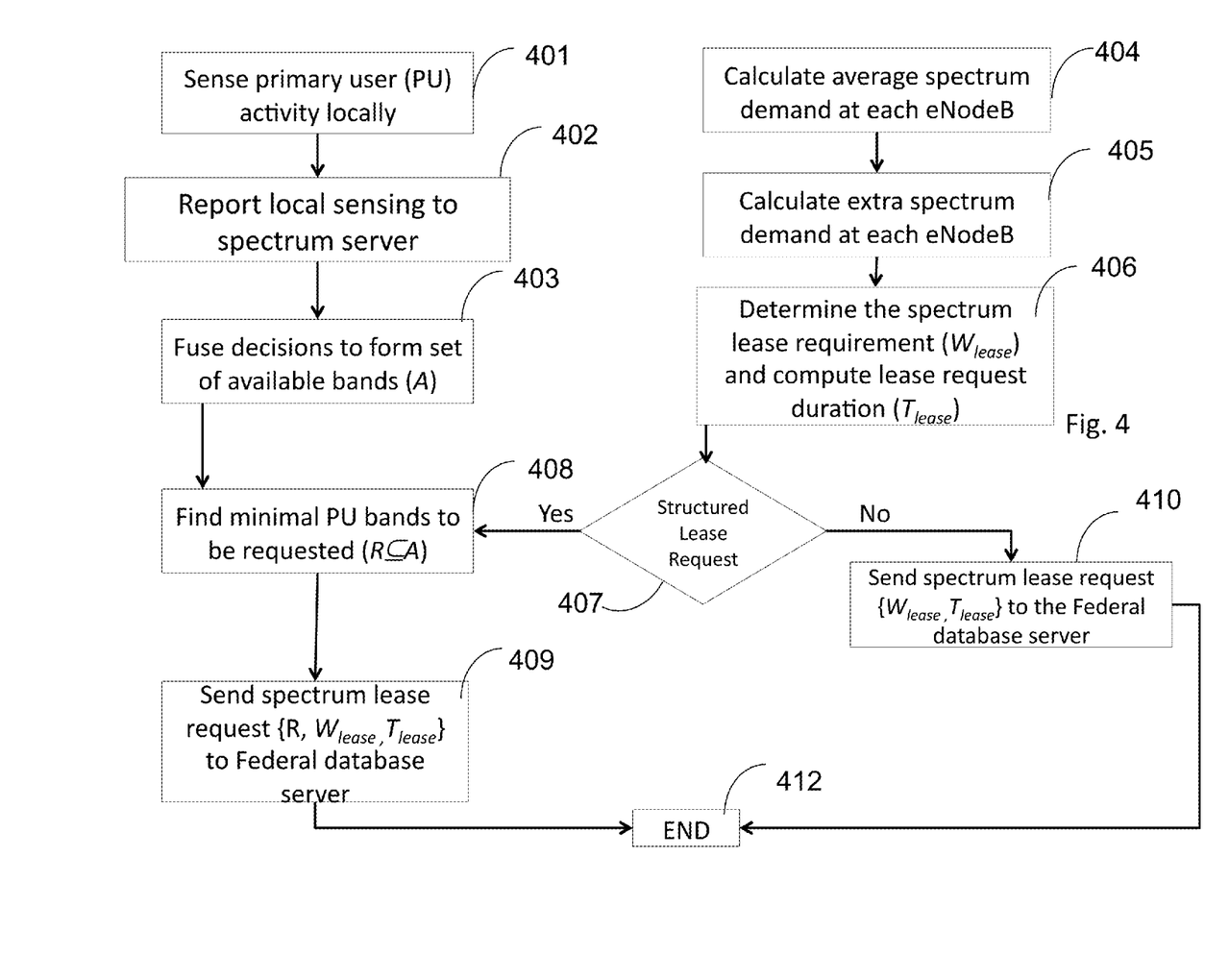
FIG. 4 is a flow diagram of an exemplary process for estimating the bandwidth demand of an LTE network and determining the available primary spectrum to prepare a spectrum lease request to obtain a spectrum lease from the federal database server.

Referring to FIG. 4, an exemplary process is illustrated for estimating the bandwidth demand of an LTE network and determining the available primary spectrum to obtain with a spectrum lease from the federal database server. This process occurs in the LTE network after the spectrum server 114 gets the registration response 314 from the federal database server. and before it sends the channel query 322. In general, this requires a determination of the activity of both primary users and secondary users.

At a step 401, each eNodeB, during a sensing interval, independently senses the activity of primary users (PU) in all known PU bands. Then at step 402, each eNodeB sends soft or hard decisions (as required) regarding the activity to the spectrum server 114. Then at step 403, for each PU band, the spectrum server optimally combines the sensing decisions from all the eNodeBs and prepares a set of available bands, denoted by A.

At a step 404, each secondary user reports its uplink capacity requirements and channel-quality-indicator (CQI) metric to its serving eNodeB which then maps it to the user's bandwidth demand. At a step 405, each eNodeB computes the bandwidth required to serve all active users in addition to the currently available spectrum. At step 406, each eNodeB reports its bandwidth requirement to the spectrum server, which then computes the additional spectrum to be requested (Wlease) from the federal database 406. The spectrum server also computes the time duration (Tlease) for which this additional spectrum needs to be requested based on the requirements of eNodeBs. At a step 407, it is determined whether a structured or unstructured lease request is required by the federal database server. In the case of a structured lease request, at a step 408, the spectrum server additionally determines a minimum number of available PU bands R ($R \subseteq A$) that if granted access to, would completely meet the overall bandwidth requirements. It then sends the spectrum lease request (R; Wlease; Tlease) to the federal database server at a step 409. In the case of unstructured lease request, the spectrum server sends (Wlease; Tlease) to the federal database at a step 410. In either case, the procedure then terminates at 412. FIG. 4 thus illustrates an exemplary method for estimating bandwidth demand of an LTE network and identifying a needed request for resources.

Figure 5:
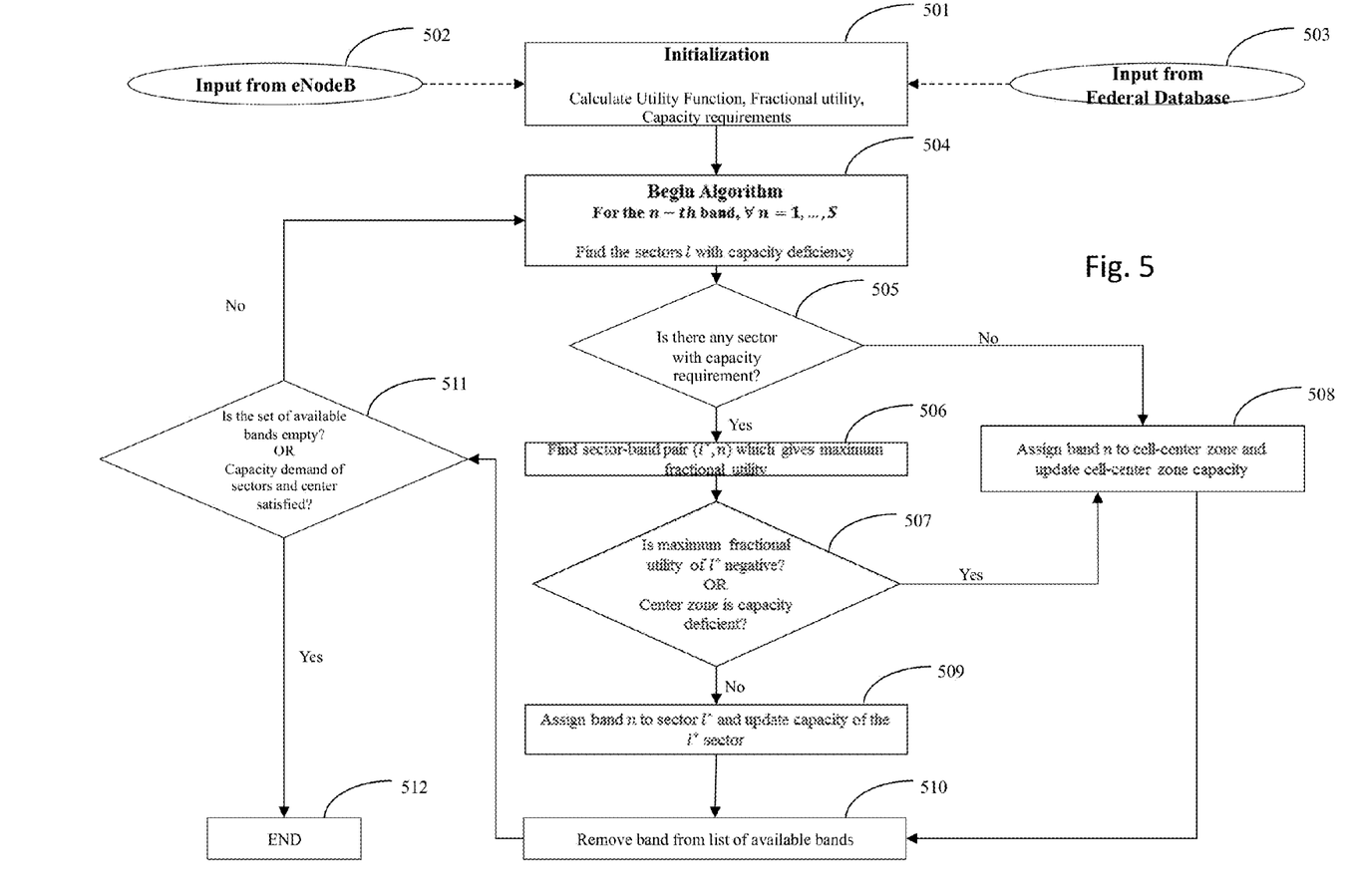
FIG. 5 is a flow diagram of an exemplary level one process for allocation of leased frequency bands to cell zones of the LTE wireless system by a radio network controller.

FIG. 5 is a flow diagram of an exemplary process for resource allocation of frequency bands provided by the federal database server, to the cell center zone or cell-edge zones (sectors) of the eNodeBs. The spectrum server performs this allocation, which is termed a Level 1 algorithm. This process repeats every $T_{eNB}$ transmission time interval (TTI). A step 501 is an initialization step, which requires input from the eNodeB at step 502, namely, the average achievable rates for each end user (UE) UE-base station pair, the minimum per-UE capacity requirements, the demand factors of the UEs, and the local sensing decisions for each cell-center zone and cell-edge sector zone. Initialization also requires input from the federal database server at step 503, namely, the spectrum bands to be used for allocation and the restrictions on the transmissions within each cell center zone or sector, which are modeled as binary federal decision variables. Further details regarding steps 501, 502 and 503 are provided with respect to FIG. 8, described below.

In general, during initialization step 501, all the sub-bands are allocated to a set $C_{init}$. For each sub-band UE pair, a utility function for assigning band n to a UE within the cell center zone or to a cell-edge zone (sector) is calculated. The fractional utility gain gives the utility of assigning the n-th band to the cell-edge zones rather than the center. The capacity requirement for each of the cell-edge zones and the cell-center zone are calculated. The sub-bands available for allocation are initialized to a set Z. Two variables modeling increase in allocated capacity of cell-center and cell-edge zones are declared and initialized to zero. The algorithm iterates over each sub-band. At each iteration, a sub-band is allocated to the cell-center zone or a cell-edge zone.

Still referring to FIG. 5, at step 504, the algorithm begins for the n=1-st band. At step 504, the sectors 1 with capacity deficiency, (i.e., when the difference between required capacity and the capacity increment variable is greater than zero) are identified for the n-th sub-band, and processing proceeds to a step 505. At step 505, a determination is made whether there are any sectors with capacity. If so, processing proceeds to step 506. If not, processing proceeds to step 508. At step 506 the sector-band pair (1_, n) that gives the maximum fractional utility for assignment of the sub-band is identified and processing proceeds to step 507. At step 507, it is checked whether maximum fractional utility is negative and the center zone is capacity deficient. If yes, the processing proceeds to step 508. If no, processing proceeds to step 509. At step 508, the sub-band n is assigned to the cell-center zone, the variable modeling capacity increment of the cell-center zone is updated to reflect the assigned capacity of the n-th sub-band and the processing proceeds to step 510. At step 509, the sub-band n is assigned to sector 1*, the capacity increment variable for sector 1* is updated to reflect the assigned capacity of the n-th sub-band and the processing proceeds to step 510. At step 510, the assigned sub-band is removed from the set Z of sub-bands available for allocation and processing proceeds to step 511. At step 511, a determination is made whether the set Z is empty or if the capacity requirement of center and sector zones is satisfied. If yes, then the process ends at 512. If not, then the process loops back to step 504 and reiterates for n=n+1. The output of the algorithm is the allocation of sub-bands in a cell-center zone or one of each of the three cell-edge zones. This information is then input to the Level 2 algorithm as described with respect to FIG. 6.

FIG. 5 thus describes an exemplary process for allocating resources between the cell center and cell edge users. The spectrum server manages functions that include: determining resource needs of multiple users, making requests to a federal database server, and allocating awarded resources back to users. The resource allocation algorithm at the spectrum server tries to maintain an acceptable QoS for users while still satisfying the capacity demand of the users within the cells. The algorithm divides each cell into a center zone and three sector zones. The algorithm takes as feedback a novel metric called the average demand factor from each eNodeB under the spectrum server's control. The eNodeBs compute this metric for each center and sector zone over multiple users (averaged over multiple transmission time intervals (TTIs)). This metric models the rate requirement of capacity deficient users at cell-edge zones and thus ensures fairness in allocation of resources to each of the four zones. The calculation of the fractional utility metric is also unique in a way that it makes it easy to incorporate the federal and local sensing decision variables.

Figure 6:
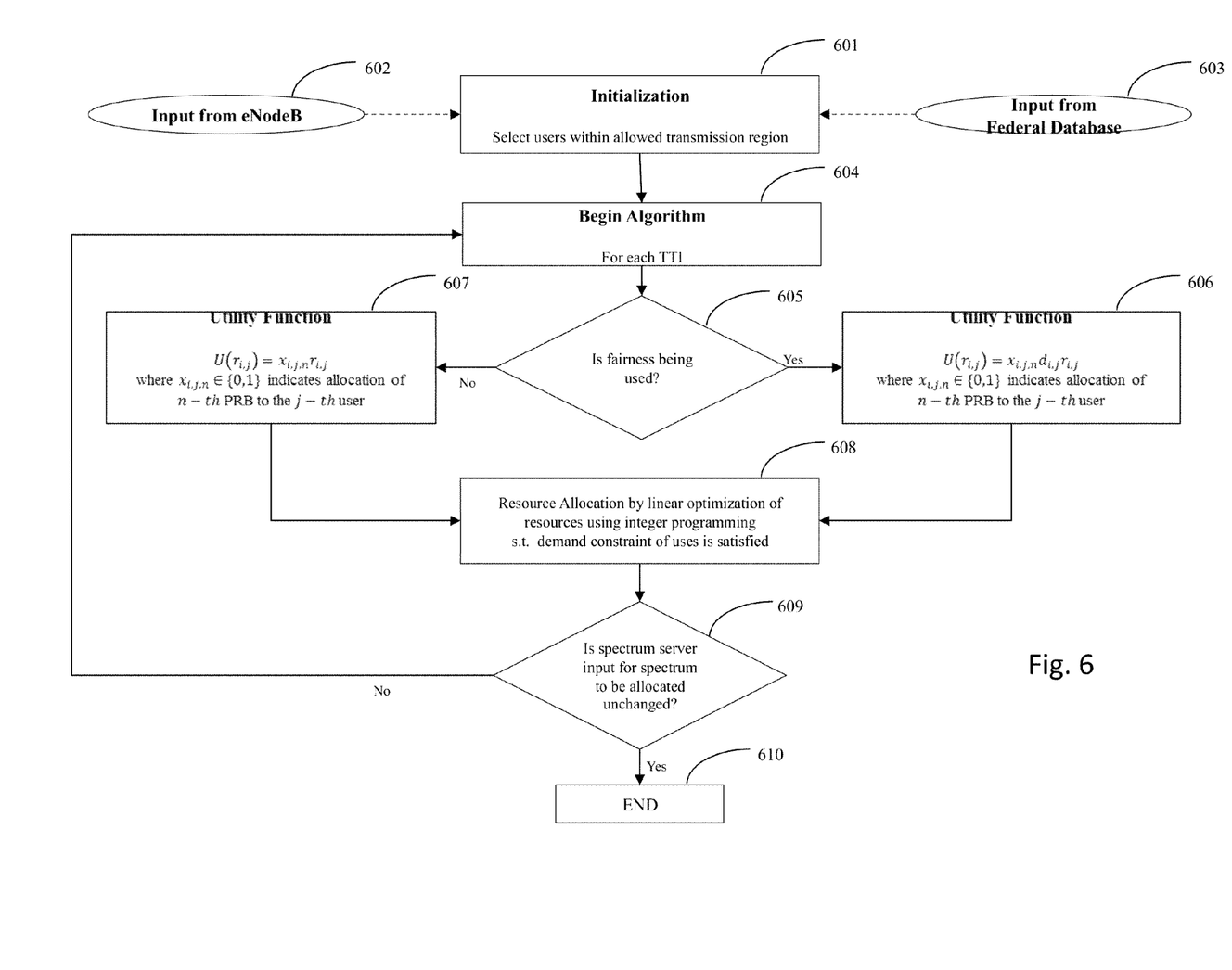
FIG. 6 is a flow diagram of an exemplary level two process for allocation of frequency bands to users within single cell zones of the LTE wireless system.

FIG. 6 illustrates an exemplary process for allocation of frequency bands to users within a single cell zone, which runs at each eNodeB, and incorporates a so-called level 2 algorithm. This process is initialized at a step 601, includes as input from block 602 the allocations of bands to cell center zones and sectors (which are determined from the level 1 algorithm), and also includes as input the federal resource allocation decision variables from block 603 (illustrated in block 802 of FIG. 8).

The initialization stage fuses the local sensing decisions and federal decision variables to allocate resources to select users within permitted transmission zones. The algorithm begins at block 604. The algorithm has two modes—a proportional fairness mode and a linear utility maximization mode. At a step 605, a decision is made whether the proportional fairness model is to be used. If proportional fairness is used, processing proceeds to a step 606, if not, processing proceeds to a step 607. At step 606, a linear utility function, utilizing demand factors to enforce fairness, is calculated for each user within the permitted transmission zones of the cell, and processing then proceeds to a step 608. At step 607, a linear utility function, similar to block 606 but without the demand factor, is calculated for each user within the permitted transmission zones of the cell, and processing proceeds to step 608. At step 608, an integer program is solved for linear utility maximization to find the optimal resource allocation in terms of the Boolean variable. From step 608, processing proceeds to step 609. At step 609, the algorithm checks if the allocation of bands from the spectrum server is unchanged. If yes, then processing ends in block 610. If no, processing proceeds to step 604 and repeats with the new allocation. The Level 2 algorithm runs at every TTI while the Level 1 spectrum server algorithm runs for a time period constituting multiple transmission intervals. The spectrum server monitors the utility of frequency allocation at each eNodeB and runs the Level 1 algorithm each time the utility decreases, or until the federal lease expires.

Figure 7:
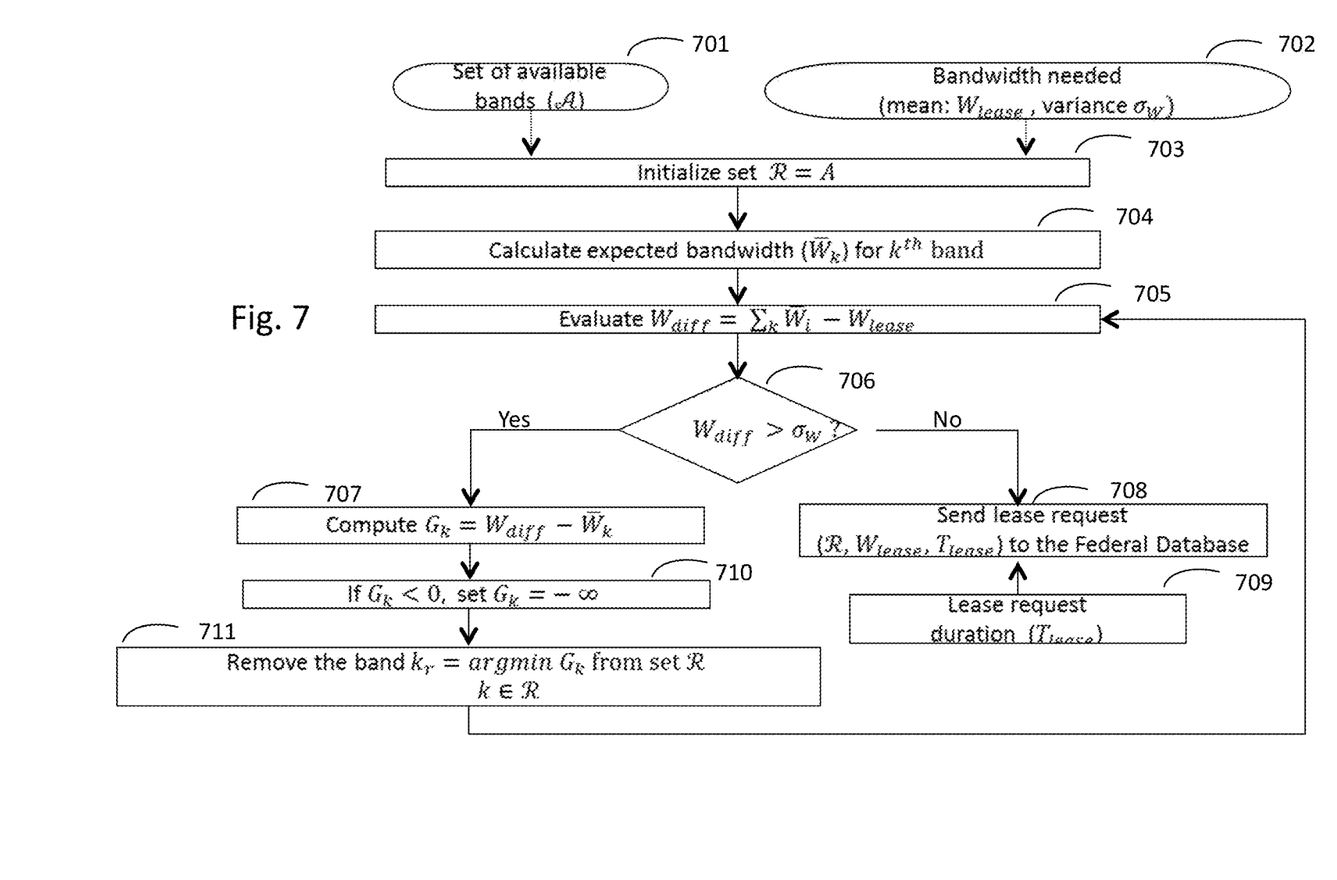
FIG. 7 is a flow diagram providing more detail about the exemplary allocation request process illustrated in FIG. 4 between the spectrum server and the federal database server.

Referring to the FIG. 7, more detail is provided for an exemplary process for a spectrum allocation request between the spectrum server 114 and the federal database server 118 such as is more generally described in FIG. 4. This exemplary process is used by the spectrum server to determine the minimal primary user (PU) bands to be requested of the federal spectrum database server. This process starts off with information about available bands, A, input at step 701 and the average bandwidth required, $W_{lease}$, input at step 702. Then at a step 703, the set of the bands to be requested, R, is initialized as A. Utilizing the knowledge of the duty cycle of PU, the process determines the expected bandwidth $\overline{W}_k$ for each band in R at a step 704. Then at step 705, $W_{diff}$, the difference between the total expected bandwidth (if R is requested) and the bandwidth required is calculated. Letting $\sigma_W$ represent the standard deviation in the required bandwidth in a particular time interval, at step 706 a check is made whether $W_{diff} > \sigma_W$. If no, processing proceeds to step 708, and a lease request (R; $W_{lease}$; $T_{lease}$) is sent to the federal database server, where $T_{lease}$ is the lease duration, determined at step 709. If true, processing proceeds to step 707. At step 707, $Gk = W_{diff} - W_k$ is computed for each band k in R, and processing then proceeds to a step 710. At step 710, negative values of Gk are set to $-\infty$ (negative infinity). Then at step 711, a band is selected which if removed minimizes $W_{diff}$, and processing proceeds back to step 705. In this manner, steps are repeated to successively remove the PU bands until $W_{diff} < \sigma_W$ is achieved and a lease request can be sent at step 708.

Figure 8:
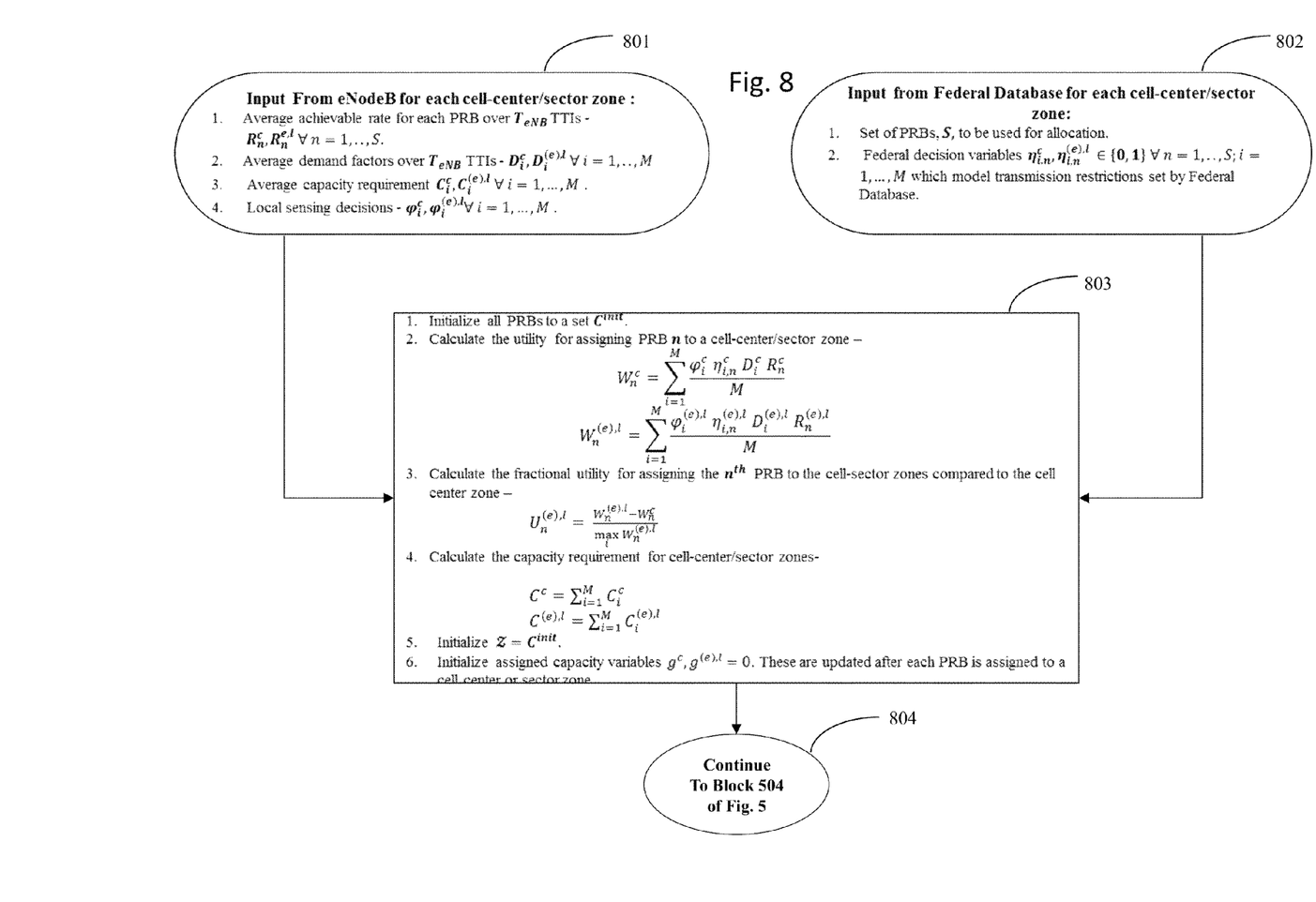
FIG. 8 is a flow diagram providing more detail for steps 501, 502, 503 of the exemplary allocation request process illustrated in FIG. 5, and which includes calculating the utility function, determining fractional utility, and quantifying capacity requirements.
Figure 9:
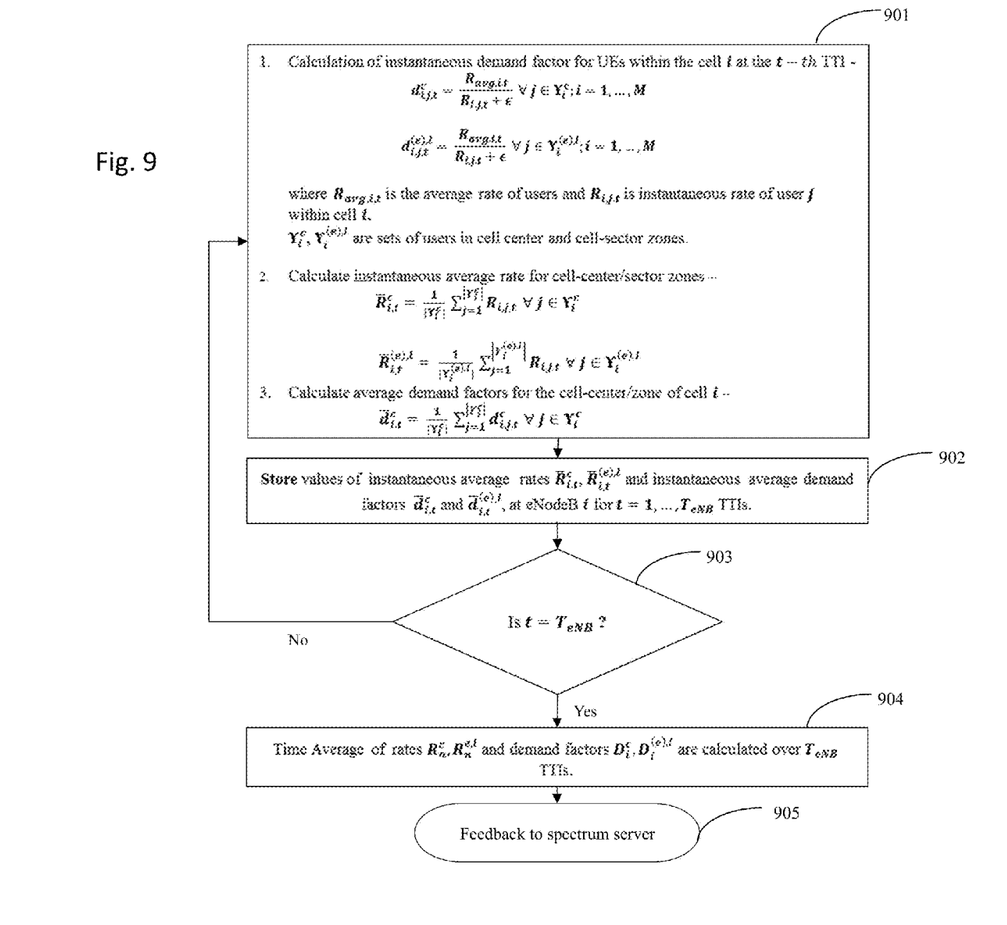
FIG. 9 is a flow diagram of an exemplary process for calculating various items of block 802 of FIG. 8, which occurs as periodic interaction between the spectrum server and multiple eNodeBs.

FIG. 8 illustrates an exemplary process for the initialization phase, or step 501, 502, and 503 of the Level 1 spectrum server algorithm illustrated in FIG. 5. In particular, at a step 801 (corresponding to step 502 of FIG. 5), the spectrum server receives inputs from the eNodeBs within its network. These inputs include: average achievable rate for each physical resource block (PRB) for each cell-center or cell-edge zone over $T_{eNB}$ TTIs; the average demand factors; the average capacity requirements; and the local sensing decisions (as set forth in the REM). FIG. 9 provides more detail for these calculations.

At a step 802 (corresponding to step 503 of FIG. 5), the spectrum server takes as input the set of PRBs which can be allocated to UEs and the federal decision variables. The initialization step 501 of FIG. 5 is detailed in 803. All PRBs are initialized to a set $C^{init}$. The utility for assigning the $n^{th}$ PRB to the cell-center zone, $W_n^c$ and the utility for assigning it to the cell-sector zone 1, $W_n^{c(e),l}$ are calculated. These utilities are average rate based utility functions that incorporate the average demand factor for each cell center and sector zone, the federal decision variables and the local sensing decisions from 801. A fractional utility for assigning a PRB to a sector as opposed to the center zone is calculated. The capacity requirement for the cell-center and cell sector zones is calculated. The set of PRBs $C^{init}$ is assigned to the set Z. Capacity assignment variables $g^c$ and $g^{(e),l}$ are initialized to 0. These variables are used in steps 508 and 509 respectively. At step 804, this process is linked to block 504 of FIG. 5.

The advantages of the present method and system include, without limitation, a process that incorporates hybrid interaction between spectrum sensing and database of incumbent users to enable spectrum sharing between heterogeneous networks. Furthermore, the present method and system implements localized radio environment mapping as a support tool for spectrum sharing. Specific embodiments, though not limited to, present novel approaches to identifying the need for spectrum resources, a process for interacting with a spectrum database, allocating awarded spectrum to cell centers and cell edges, and allocating these resources amongst users in a single cell.

In a broad embodiment, the present method and system is a method and system for spectrum sharing between multiple heterogeneous users. The method implements an interaction between a spectrum server, database of incumbent users, and localized spectrum sensing.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

What is claimed is:

1. A method for dynamic spectrum sharing between primary users of a spectrum band and secondary users in a cellular network of a commercial cellular operator, the method comprising:
    transmitting a spectrum request to a government entity owning a frequency band of interest, wherein the spectrum request includes desired frequency band parameters,
    receiving a spectrum band assignment in response to the spectrum request, wherein the spectrum band assignment includes a plurality of primary resource blocks,
    building a radio environment map (REM) relating to local radio conditions sensed within a cell in the cellular network of the cellular operator, and
    allocating the received spectrum band assignment via a resource optimization process that is based on:
    the radio environment map, and
    an average demand factor of secondary users within the cell indicative of different demands of each of the secondary users based on usage parameters including the location of each of the secondary users in the cell in one of a plurality of zones within the cell, the plurality of zones including at least (i) a center zone and (ii) an outer zone, the average demand factor being calculated based on a model of rate requirements of the capacity deficient secondary users in the plurality of zones within the cell.

2. The method of claim 1, further including:
    receiving information from sensors relating to demand of the secondary users in the cellular network,
    calculating an average spectrum demand from the received information, and wherein the spectrum request is based on the average spectrum demand of the secondary users.

3. The method of claim 2, further wherein the spectrum request includes a request duration.

4. The method of claim 1, further including sensing primary user activity, forming a set of available bands within the frequency band of interest based on the sensed primary user activity, and wherein the spectrum request includes the formed set of available bands within the frequency band of interest.

5. The method of claim 4, further wherein the spectrum request takes into account the quality of service requirements of the secondary users.

6. The method of claim 4, wherein the spectrum band assignment further includes conditions on use.

7. The method of claim 4, further wherein the spectrum band assignment is revocable based upon real-time interference data.

8. The method of claim 4, further wherein the spectrum request includes a request duration.

9. The method of claim 1, further including obtaining data from an enhanced Government Master File (eGMF) to incorporate in the REM.

10. The method of claim 1, further wherein the allocation step includes first allocating the primary resource blocks to one of a set of zones of the cell, and then allocating the resources in each zone to secondary users within the corresponding zone.

11. The method of claim 10, wherein the primary resource blocks are allocated to one of a set of zones of the cell by calculating a utility for assigning a primary resource block to a zone, and calculating a fractional utility for assigning that primary resource block to the outer zone rather than the center zone.

12. The method of claim 11, further wherein the resource optimization process includes finding a sector-band pair which gives maximum fractional utility.

13. The method of claim 10, wherein the step of allocating the resources in each zone to secondary users within the corresponding zone includes use of a utility function corresponding to each secondary user.

14. The method of claim 13, wherein a proportional fairness algorithm is used and a logarithmic utility function is used.

15. The method of claim 13, wherein the step of allocating the resources in each zone to secondary users within the corresponding zone includes a linear optimization of resources using integer programming subject to a demand constraint.

16. The method of claim 1, further wherein the resource optimization process is further based on an average achievable rate of a primary resource block of the spectrum band assignment.

17. A method for dynamic spectrum sharing between primary users of a spectrum band and secondary users in a cellular network of a commercial cellular operator, the method comprising:
transmitting a spectrum request to a government entity owning a frequency band of interest, wherein the spectrum request includes desired frequency band parameters,
receiving a spectrum band assignment in response to the spectrum request, wherein the spectrum band assignment includes a plurality of primary resource blocks and conditions on use, building a radio environment map (REM) relating to local radio conditions sensed within a cell in the cellular network of the cellular operator, and
allocating the received spectrum band assignment via a first resource optimization process that allocates the primary resource blocks to one of a set of zones of the cell and via a second resource optimization process that allocates the resources in each cell zone to secondary users with the corresponding zone according to a predetermined utility function, the first resource optimization process is based on:
the radio environment map, and
an average demand factor of secondary users within the cell indicative of different demands of each of the secondary users based on usage parameters including the location of each of the secondary users in the cell in one of the set of zones within the cell, the set of zones including at least (i) a center zone and (ii) an outer zone, the average demand factor being calculated based on a model of rate requirements of capacity deficient secondary users in the set of zones within the cell.

18. The method of claim 17, further including:
receiving information from sensors relating to demand of the secondary users in the cellular network,
calculating an average spectrum demand from the received information, and wherein the spectrum request is based on the average spectrum demand of the secondary users.

19. The method of claim 18, further wherein the spectrum request includes a request duration.

20. The method of claim 17, further including sensing primary user activity, forming a set of available bands within the frequency band of interest based on the sensed primary user activity, and wherein the spectrum request includes the formed set of available bands within the frequency band of interest.

21. The method of claim 17, further wherein the first resource optimization process is further based on an average achievable rate of a primary resource block of the spectrum band assignment.

22. A system for dynamic spectrum sharing between primary users of a spectrum band and secondary users, the system comprising:
a cellular network of a commercial cellular operator,
sensors for sensing local radio conditions within a cell of the cellular network, and
a spectrum server for transmitting a spectrum request to a government entity owning a frequency band of interest, wherein the spectrum request includes desired frequency band parameters, for receiving a spectrum band assignment in response to the spectrum request, wherein the spectrum band assignment includes a plurality of primary resource blocks and conditions on use, for building a radio environment map (REM) using information from the sensors, and for allocating the received spectrum band assignment via a resource optimization process that is based on:
the radio environment map, and
an average demand factor of secondary users within the cell indicative of different demands of each of the secondary users based on usage parameters including the location of each of the secondary users in the cell in one of a plurality of zones within the cell, the plurality of zones including at least (i) a center zone and (ii) an outer zone, the average demand factor being calculated based on a model of rate requirements of capacity deficient secondary users in the plurality of zones within the cell.

23. The system of claim 22, further wherein the resource optimization process is further based on an average achievable rate of a primary resource block of the spectrum band assignment.

* * * * *

UNITED STATES PATENT AND TRADEMARK OFFICE
CERTIFICATE OF CORRECTION

PATENT NO. : 9,516,508 B2  
APPLICATION NO. : 13/835012  
DATED : December 6, 2016  
INVENTOR(S) : Amanna et al.

Page 1 of 1

It is certified that error appears in the above-identified patent and that said Letters Patent is hereby corrected as shown below:

On the Title Page

Item (71), Lines 5-6, "Robert McGweir" should read --Robert McGwier--.

Item (72), Lines 5-6, "Robert McGweir" should read --Robert McGwier--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*